US011536979B2

(12) United States Patent
Beck et al.

(10) Patent No.: US 11,536,979 B2
(45) Date of Patent: Dec. 27, 2022

(54) OPTICAL ARRANGEMENT AND LASER SYSTEM

(71) Applicant: TRUMPF LASER- UND SYSTEMTECHNIK GMBH, Ditzingen (DE)

(72) Inventors: Torsten Beck, Stuttgart (DE); Daniel Flamm, Stuttgart (DE); Andreas Heimes, Renningen (DE); Julian Hellstern, Rottweil (DE); Christian Lingel, Stuttgart (DE); Felix Marschall, Leinfelden-Echterdingen (DE); Silke Thierfelder, Ditzingen (DE); Christoph Tillkorn, Villingendorf (DE)

(73) Assignee: TRUMPF LASER- UND SYSTEMTECHNIK GMBH, Ditzingen (DE)

( * ) Notice: Subject to any disclaimer, the term of this patent is extended or adjusted under 35 U.S.C. 154(b) by 236 days.

(21) Appl. No.: 17/253,664

(22) PCT Filed: Jun. 5, 2019

(86) PCT No.: PCT/EP2019/064581
§ 371 (c)(1),
(2) Date: Dec. 18, 2020

(87) PCT Pub. No.: WO2019/243042
PCT Pub. Date: Dec. 26, 2019

(65) Prior Publication Data
US 2021/0255466 A1 Aug. 19, 2021

(30) Foreign Application Priority Data
Jun. 22, 2018 (DE) ...................... 10 2018 115 126.8

(51) Int. Cl.
*G02B 27/09* (2006.01)
*B23K 26/06* (2014.01)
(Continued)

(52) U.S. Cl.
CPC ...... *G02B 27/0927* (2013.01); *B23K 26/0643* (2013.01); *B23K 26/0648* (2013.01);
(Continued)

(58) Field of Classification Search
CPC ................ Y02A 30/14; B23K 26/0608; B23K 26/0643; B23K 26/0648; B23K 26/0738;
(Continued)

(56) References Cited

U.S. PATENT DOCUMENTS 5,886,313 A * 3/1999 Krause ............... B23K 26/0652
219/121.6
2006/0202115 A1 9/2006 Lizotte et al.
(Continued)

FOREIGN PATENT DOCUMENTS

CN 202904125 U 4/2013
DE 102006018504 A1 10/2007
(Continued)

*Primary Examiner* — Joseph P Martinez
*Assistant Examiner* — Vipin Patel
(74) *Attorney, Agent, or Firm* — Leydig, Voit & Mayer, Ltd.

(57) ABSTRACT

An optical arrangement converts an input laser beam into a line-like output beam, which propagates along a propagation direction and which has, in a working plane, a line-like beam cross section extending along a line direction. The optical system includes: a reshaping optical unit having an input aperture, through which the input laser beam is radiated, and an elongate output aperture, elongatedly extending along an aperture longitudinal direction, the reshaping optical unit converting the input laser beam radiated through the input aperture into a beam packet exiting through the output
(Continued)

aperture; and a homogenization optical unit which converts the beam packet into the line-like output beam, different beam segments of the beam packet being intermixed and superimposed along the line direction. The aperture longitudinal direction extends in a manner rotated about the propagation direction by a non-vanishing angle of rotation with respect to the line direction.

16 Claims, 9 Drawing Sheets

(51) Int. Cl.
    *B23K 26/073*    (2006.01)
    *G02B 17/00*    (2006.01)
    *G02B 27/14*    (2006.01)

(52) U.S. Cl.
    CPC ........ *B23K 26/0738* (2013.01); *G02B 17/006* (2013.01); *G02B 27/0972* (2013.01); *G02B 27/0988* (2013.01); *G02B 27/145* (2013.01)

(58) Field of Classification Search
    CPC .............. G02B 17/006; G02B 27/0927; G02B 27/0972; G02B 27/0988; G02B 27/145
    See application file for complete search history.

(56) References Cited

U.S. PATENT DOCUMENTS

2015/0049376 A1    2/2015    Inoue et al.
2017/0176758 A1    6/2017    Lerner et al.

FOREIGN PATENT DOCUMENTS

| DE | 102008033358 A1 | 2/2009 |
| DE | 112013002095 T5 | 1/2015 |
| TW | 200643671 A | 12/2006 |
| WO | WO 2007122061 A1 | 11/2007 |
| WO | WO 2018019374 A1 | 2/2018 |

* cited by examiner

OPTICAL ARRANGEMENT AND LASER SYSTEM

CROSS-REFERENCE TO PRIOR APPLICATIONS

This application is a U.S. National Phase Application under 35 U.S.C. § 371 of International Application No. PCT/EP2019/064581, filed on Jun. 5, 2019, and claims benefit to German Patent Application No. DE 10 2018 115 126.8, filed on Jun. 22, 2018. The International Application was published in German on Dec. 26, 2019, as WO 2019/243042 A1 under PCT Article 21(2).

FIELD

The present invention is related to an optical arrangement and a laser system.

BACKGROUND

Laser systems are used to generate, in particular, high-intensity radiation with an intensity distribution that has a beam cross section that extends in a line-like manner. In the following, the axis defined by the line-like extension is referred to as the "long axis" of the intensity distribution. An axis perpendicular to the direction of the line and perpendicular to the direction of propagation is referred to as the "short axis." For the purpose of describing the geometric relationships, the long axis (x), the short axis (y), and the direction of propagation (z) should define an oriented, right-handed Cartesian coordinate system.

Such beam profiles are used, for example, to treat the surfaces of glasses or semiconductors (e.g. tempering, annealing). For this purpose, the line-like beam profile is scanned over the surface to be treated so as to be substantially perpendicular to the long axis. The radiation can trigger, for example, recrystallization processes, superficial melting, or diffusion processes of foreign materials into the material to be processed, or other phase changes in the region of the surface. Such treatment processes are used, for example, in the manufacture of thin-film-transistor (TFT) displays, in the doping of semiconductors, and in the manufacture of solar cells, but also in the manufacture of aesthetically designed glass surfaces for building purposes.

An optical arrangement is described in WO 2018/019374 A1.

SUMMARY

An embodiment of the present invention provides optical arrangement that converts an input laser beam into a line-like output beam, which propagates along a direction of propagation and which has, in a working plane, a line-like beam cross section of non-vanishing intensity that extends along a direction of a line. The optical system includes: a reshaping optical unit having an input aperture, through which the input laser beam can be radiated, and an elongate output aperture, which extends along an aperture longitudinal direction in an elongate manner, the reshaping optical unit being configured such that the input laser beam radiated through the input aperture is converted into a beam packet exiting through the output aperture; and a homogenization optical unit which is designed to convert the beam packet into the line-like output beam, different beam segments of the beam packet being intermixed and superimposed along the direction of the line. The aperture longitudinal direction extends in a manner rotated about the direction of propagation by a non-vanishing angle of rotation with respect to the direction of the line.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The aforementioned treatment processes require the intensity profile along the long axis to have an intensity curve that is as homogeneous as possible and substantially constant. The process result of the aforementioned treatment processes also depends heavily on the intensity curve along the short axis. For example, unintended peaks in the intensity curve or excessively steep sides of the intensity profile can have an unfavorable effect on the recrystallization of a semiconductor surface, or can lead to thermal stresses. Depending on the field of application, it may be desirable, for example, for the beam profile to have a curve along the short axis that is constant in some regions and has inclined sides.

A problem addressed by embodiments of the present invention is that of providing an intensity distribution with the most homogeneous possible intensity curve along the long axis, and improving the properties of the intensity profile along the short axis with regard to the desired process results. In particular, the intensity distribution should be adaptable to different fields of application.

This problem is solved by an optical arrangement according to embodiments of the present invention. The optical arrangement is an apparatus for converting an input laser beam into an output beam having a line-like intensity profile. In this respect, the output beam propagates (on a spatial average) in a direction of propagation and has an intensity distribution which, in an optical working plane of the optical arrangement, has a beam cross section with a line-like curve along a direction which is referred to in the present context as the "direction of the line."

The optical arrangement comprises a reshaping optical unit having an input aperture through which the input laser beam can be radiated, and an elongate output aperture. The output aperture extends in an elongate manner along an aperture longitudinal direction. In this respect, the dimension of the output aperture along the aperture longitudinal direction is considerably larger than the dimension perpendicular to the aperture longitudinal direction.

The reshaping optical unit is designed in such a way that the input laser beam radiated through the input aperture is converted into a beam packet, which in a theoretical viewing plane downstream of the output aperture already forms an intensity distribution with a substantially line-shaped character. The beam packet in particular comprises a large number of beam segments, which are distributed in particular over the elongate output aperture and preferably completely fill the output aperture.

The optical arrangement also comprises a homogenization optical unit, which is arranged in such a way that the beam packet exiting from the reshaping optical unit is captured, and which is designed to convert the exiting beam packet into the desired line-like intensity profile. The homogenization optical unit is designed in such a way that it intermixes and superimposes different beam segments of the beam packet along the direction of the line, and the intensity profile is thereby homogenized with respect to the direction of the line.

The aperture longitudinal direction does not extend in parallel with the direction of the line. Rather, the aperture longitudinal direction extends in a manner rotated about the direction of propagation by a non-vanishing angle of rotation with respect to the direction of the line. In this respect, the aperture longitudinal direction and the direction of the line, in projection onto a plane perpendicular to the direction of propagation (i.e. in the x-y plane), enclose the angle of rotation between them. The angle of rotation can be defined as the acute angle enclosed in the mathematically positive sense between the direction of the line and the aperture longitudinal direction (i.e., the angle measured in the mathematically positive sense starting from the x-axis of the Cartesian coordinate system). Because the absolute value of the angle of rotation is substantially decisive for the optical result, the angle of rotation can also be defined by the absolute value of the acute angle enclosed between the aperture longitudinal direction and the direction of the line.

Due to the aforementioned embodiment, the intensity curve of the output beam along the long axis (x) differs significantly from the intensity curve along the short axis (y). The intensity distribution is largely homogeneous along the long axis (x) due to the homogenization optical unit. The intensity distribution therefore has a largely constant curve along the direction of the line or long axis (x), and falls at the peripheries with comparatively steep sides (so-called "top hat profile").

The intensities of the beam segments exiting adjacent to one another along the aperture longitudinal direction are additively superimposed along the direction of the line by the homogenization optical unit. Due to the rotationally offset curve of the aperture longitudinal direction and the direction of the line, adjacent beam segments of the beam packet are offset from one another along the short axis (y). As a result, the contributions of the individual beam segments vary along the short axis depending on the position, and therefore the intensity distribution has an inclined side in the curve along the short axis after homogenization. The incline of the side or the side steepness in this case is dependent on the angle of rotation, and can therefore, also be continuously adjusted via the angle of rotation. If a strictly defined side steepness is desired, the holder can also be designed to be stationary or the output aperture can be designed to be inclined accordingly.

Therefore, in a representation of the intensity profile as a function of a position coordinate along the short axis (x), the output beam has a substantially constant value in some regions due to the homogenization along the long axis (y), and both sides fall to the reference value (zero).

The angle of rotation is preferably greater than 0° and smaller than 90°.

In order to make the angle of rotation continuously adjustable, the reshaping optical unit can be held in the optical arrangement by means of an adjustable holder. By changing the angle of rotation, the side steepness of the intensity distribution along the short axis can be adjusted, as stated above, and the output beam can thus be adapted to different fields of application. The holder is preferably designed such that the angle of rotation is continuously adjustable.

The reshaping optical unit is preferably designed to generate a beam packet when a coherent input laser beam is radiated through the input aperture (i.e. an input laser beam that has spatial coherence over the entire extension of the input aperture) or when an at least partially coherent input laser beam is radiated, which beam packet exits from the output aperture and has reduced spatial coherence, preferably has significantly reduced spatial coherence or is incoherent. As a result, interference effects in the homogenization, which is downstream in the beam path, are reduced or entirely avoided. Such interference effects can lead to unintended intensity extremes and thereby have an adverse effect on the process results for the surface treatment described above.

The described reduction or elimination of spatial coherence can be achieved, for example, by designing the reshaping optical unit such that different optical path lengths are provided for adjacent beam segments of an input laser beam upon passing through the reshaping optical unit. In particular, the reshaping optical unit is designed in such a way that adjacent beam segments of an input laser beam are rearranged upon passing through the reshaping optical unit in such a way that the beam segments of the exiting beam packet that exit through the output aperture have covered different optical path lengths. In particular, the reshaping optical unit is designed in such a way that the optical path lengths for beam segments that enter at opposite and peripheral regions of the input aperture differ by a value that is greater than the coherence length of the input laser beam.

The reshaping optical unit is preferably designed to be plate-like and made in one piece from a material that is optically permeable or transparent for the wavelength of the input laser beam. The reshaping optical unit accordingly has a plate front side and a plate rear side that extends substantially parallel to the plate front side. In this respect, the plate front side and the plate rear side form the large delimiting faces of a plate that extends in a planar manner. In particular, a region of the plate front side is designed as an input aperture, and a region of the plate rear side provides the output aperture. The reshaping optical unit is designed in such a way that beam segments of an input laser beam, after being coupled in through the input aperture, are guided to the output aperture by at least one reflection, preferably multiple reflections, on the plate front side and the plate rear side. The number of reflections depends in particular on the radiation position and the radiation angle at the input aperture. Different beam segments of the input laser beam therefore cover different optical path lengths. In particular, the reflection takes place in such a way that different (in particular adjacent) beam segments of the input laser beam are rearranged upon passing through the reshaping optical unit, and exit through the output aperture as output beam segments.

The input aperture or the output aperture can thus be designed as a fully transparent light incoupling surface or light outcoupling surface. The remaining regions of the plate front side and the plate rear side, which do not act as an input aperture or output aperture, can be metallized, in particular provided with a reflective coating. However, embodiments in which the incoupled beams are guided by total internal reflection between the plate front side and plate rear side, so that a reflective coating is unnecessary, can also be advantageous.

The properties of the exiting beam packet can be influenced by the alignment of the aforementioned reshaping optical unit. In particular, the adjustable holder for the reshaping optical unit is designed in such a way that angles of rotation which are perpendicular to the beam propagation direction can also be set (in particular about the x and/or y axis). The positions of the beam segments upon exiting the output aperture are influenced by rotation about the x-axis and y-axis. In particular, an angle of rotation about the aperture longitudinal direction can be adjusted. The angles and positions of the beam segments upon exiting the output aperture are influenced by rotating the reshaping optical unit about the aperture longitudinal direction. In particular, the number of internal reflections and thus the optical path lengths upon passing through the reshaping optical unit can be influenced. In addition, the extension of the exiting beam packet in the direction perpendicular to the aperture longitudinal direction and to the direction of propagation can be influenced, i.e. the extension of the line-shaped profile in the short axis (y).

The adjustable holder for the reshaping optical unit is preferably designed in such a way that the reshaping optical unit can also be rotated by an angle of rotation about an axis perpendicular to the aperture longitudinal direction and perpendicular to the direction of propagation. By rotation about this axis, it is possible to vary the extent to which beam segments are separated from one another at the output aperture. The longitudinal extension and the intensity of the exiting beam packets can thus be influenced.

The output aperture is designed in particular as a flat light exit surface. Various geometric shapes can be advantageous for the output aperture. In particular, the output aperture is rectangular and has a long rectangular side that runs parallel to the aperture longitudinal direction. The output aperture can, however, also extend trapezoidally, polygonally, band-like or freeform and have a long preferred direction that extends parallel to the aperture longitudinal direction. The output aperture therefore fundamentally has a planar extension that is greater along the aperture longitudinal direction than perpendicular to the aperture longitudinal direction. By suitably shaping the output aperture, the exact intensity curve can be influenced in the region of the sides of the intensity profile, which results from the subsequent homogenization.

The homogenization optical unit preferably works in such a way that different beam segments of the beam packet, which exits from the reshaping optical unit, are not intermixed and/or are not superimposed on one another with respect to an axis perpendicular to the direction of the line and perpendicular to the direction of propagation. For example, the homogenization optical unit comprises at least one cylinder lens array having cylinder lenses extending along respective cylinder axes, the cylinder axes running perpendicular to the direction of propagation and perpendicular to the direction of the line, i.e. being oriented along the short axis (y). The cylinder lenses are in particular designed without any curvature along the short axis (y). The cylinder lenses are preferably geometrically dimensioned in such a way that the beam packet passes through a large number of adjacent cylinder lenses.

It is also conceivable for the homogenization optical unit to comprise a Fourier lens, which is designed to superimpose and intermix beam segments along the long axis or the direction of the line. For this purpose, the working plane can extend in a focus region of the Fourier lens, for example. It is conceivable, for example, for beam segments from each region of the captured radiation to be focused in different, preferably all, regions along the direction of the line.

In principle, the homogenization optical unit can be designed in such a way that the beam packet exiting from the reshaping optical unit is optically imaged in the working plane with respect to the short axis.

The aforementioned embodiments have the effect in particular that the line-like output beam along the direction of the line (long axis y) is characterized by a large beam parameter product or a large beam quality factor $M^2$ which is significantly greater than the beam parameter product or the beam quality factor with respect to the short axis. In this respect, the output beam has a high depth of focus with respect to the short axis y. When using the aforementioned optical arrangement in the laser system, adjusting, and matching the optical components to one another is simplified.

According to an advantageous embodiment, the homogenization optical unit also comprises a transverse optical unit, which can be designed for focusing and/or imaging the beam packet with respect to the short axis (y) in the working plane or in a focal plane offset from the working plane. To this extent, the transverse optical unit shapes the beam profile along the short axis. In particular, the transverse optical unit can be designed as an arrangement having two or more converging lenses which are arranged successively in the beam path. An intermediate focus of the beam packet is preferably generated in a central focal plane by means of at least one lens. Depending on the embodiment, the intermediate focus can then be imaged in the working plane with at least one further lens.

For a further embodiment, the homogenization optical unit comprises an optical low-pass filter for filtering high spatial frequencies with respect to the short axis (y). This can reduce interference artifacts along the short axis (y), which can lead to undesired intensity peaks in the output beam. Such interference artifacts can arise, for example, upon passing through the reshaping optical unit. The aforementioned low-pass filtering results in a smoothed intensity curve along the short axis and thus improves the process results in the surface processing. In the case of the transverse optical unit described above, a low-pass filter can be implemented, for example by the angular spectrum of the beam packet being imaged in the central focal plane of the lens arrangement in order to carry out the low-pass filtering there. For example, a slit stop can be arranged in the central focal plane. The slit stop has a slit-like stop opening, which extends in particular along the long axis (x). The stop opening is preferably rectangular.

The problem described at the outset is also solved by a laser system for generating radiation having an intensity distribution with a line-like intensity profile. The laser system comprises a laser light source for emitting laser radiation and an optical arrangement of the type described above. The optical arrangement is arranged such that the input laser beam is fed by the laser light source.

The laser light source is in particular suitable or designed for multi-mode operation. In principle, the laser radiation of the laser light source can be radiated directly through the input aperture. However, it is also conceivable for the laser radiation to be reshaped by means of a preforming optical unit before entering the input aperture. The preforming optical unit can be designed as a collimating optical unit, for example. For example, the preforming optical unit can act anamorphically so that the input laser beam has an elliptical beam cross section.

The line-like intensity distribution can be provided directly in the working plane of the homogenization optical unit, so that the output beam of the homogenization optical unit corresponds precisely to the overall intensity distribution of the laser system. In principle, the intensity distribution of the laser system is provided in a process plane of the laser system. The process plane can deviate from the working plane of the optical arrangement. For example, the output beam can be deflected and/or reshaped by means of further collimating and focusing optical units arranged downstream in the beam path. It can also be advantageous for the beam path to be folded by means of deflecting mirrors downstream of the homogenization optical unit. As a result, the installation space required for the laser system can be reduced.

Further details and exemplary embodiments of the present invention are described in more detail below with reference to the drawings.

In the following description and in the drawings, the same reference signs are used for identical or corresponding features.

Figure 1:
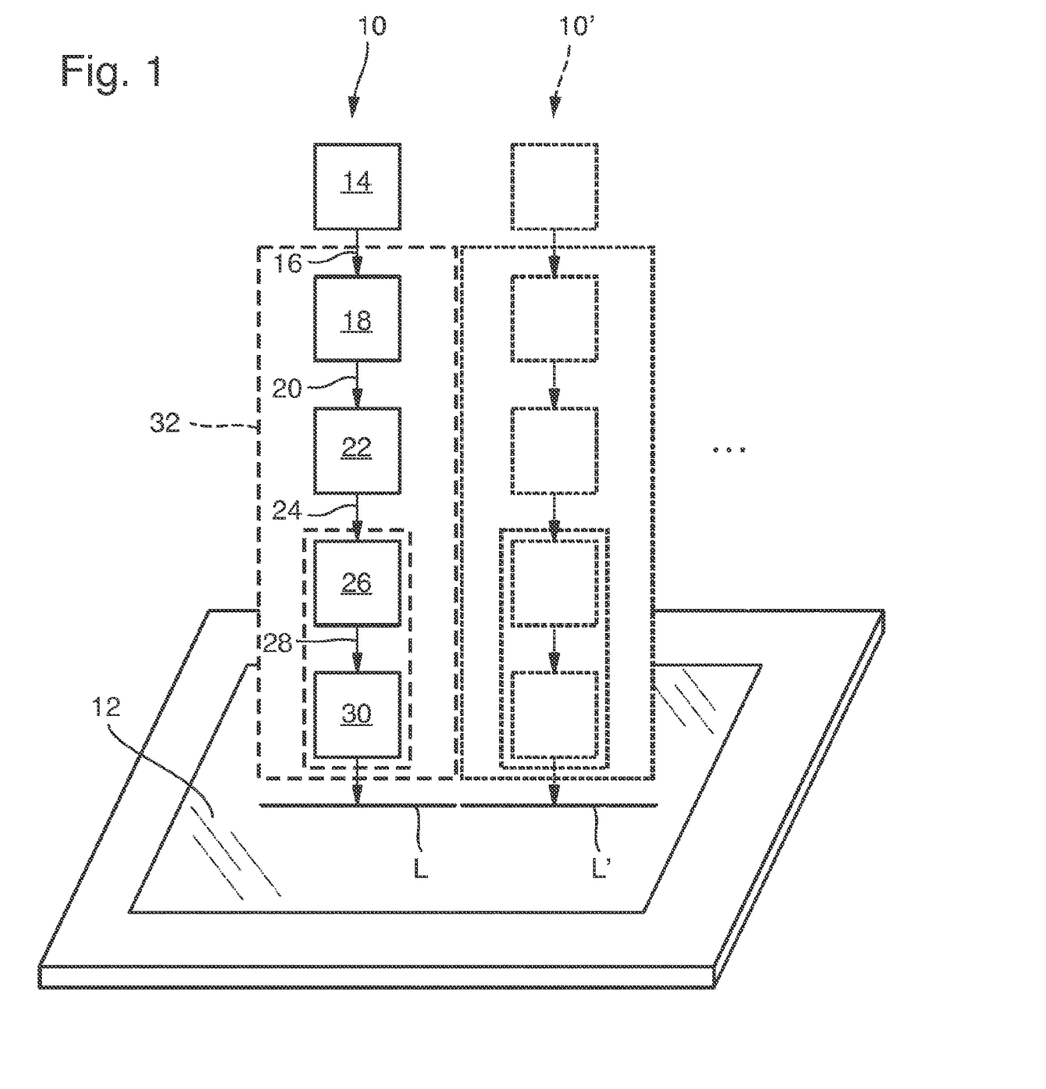
FIG. 1 is a schematic illustrating the beam path in a laser system for generating line-shaped intensity distributions.

FIG. 1 is a schematic view of a laser system 10 for generating radiation with an intensity distribution L, which has a line-shaped beam cross section in a process plane 12.

The laser system 10 comprises at least one laser light source 14 for emitting laser radiation 16. The laser light source 14 is preferably designed as a multi-mode laser. The laser radiation 16 feeds an input laser beam 20, optionally via a preforming optical unit 18. The preforming optical unit 18 can, for example, have a collimating effect and/or reshape the laser radiation 16 into an input laser beam 20 with an elliptical beam cross section.

The input laser beam 20 is guided through a reshaping optical unit 22 and exits therefrom as a beam packet 24. The beam packet 24 is converted into an output beam 28 by means of homogenization optical unit 26, as will be explained in more detail below. The output beam 28 can optionally be transformed into the intensity distribution L by means of a collimating and/or focusing optical unit 30.

For treating large surface areas, it may be desirable to achieve a very elongate, line-like intensity profile. In this respect, it is conceivable for a plurality of laser systems of the type mentioned (10, 10') to be provided and arranged in such a way that the intensity distributions L, L' complement one another to form an elongated line.

The reshaping optical unit 22 and the homogenization optical unit 26 are part of an optical arrangement 32 in which the actual conversion of the laser radiation 16 emitted by the laser light source 14 into the line-shaped form takes place. The optical arrangement 32 can also comprise the preforming optical unit 18 and/or the collimating/focusing optical unit 30.

Figure 2:
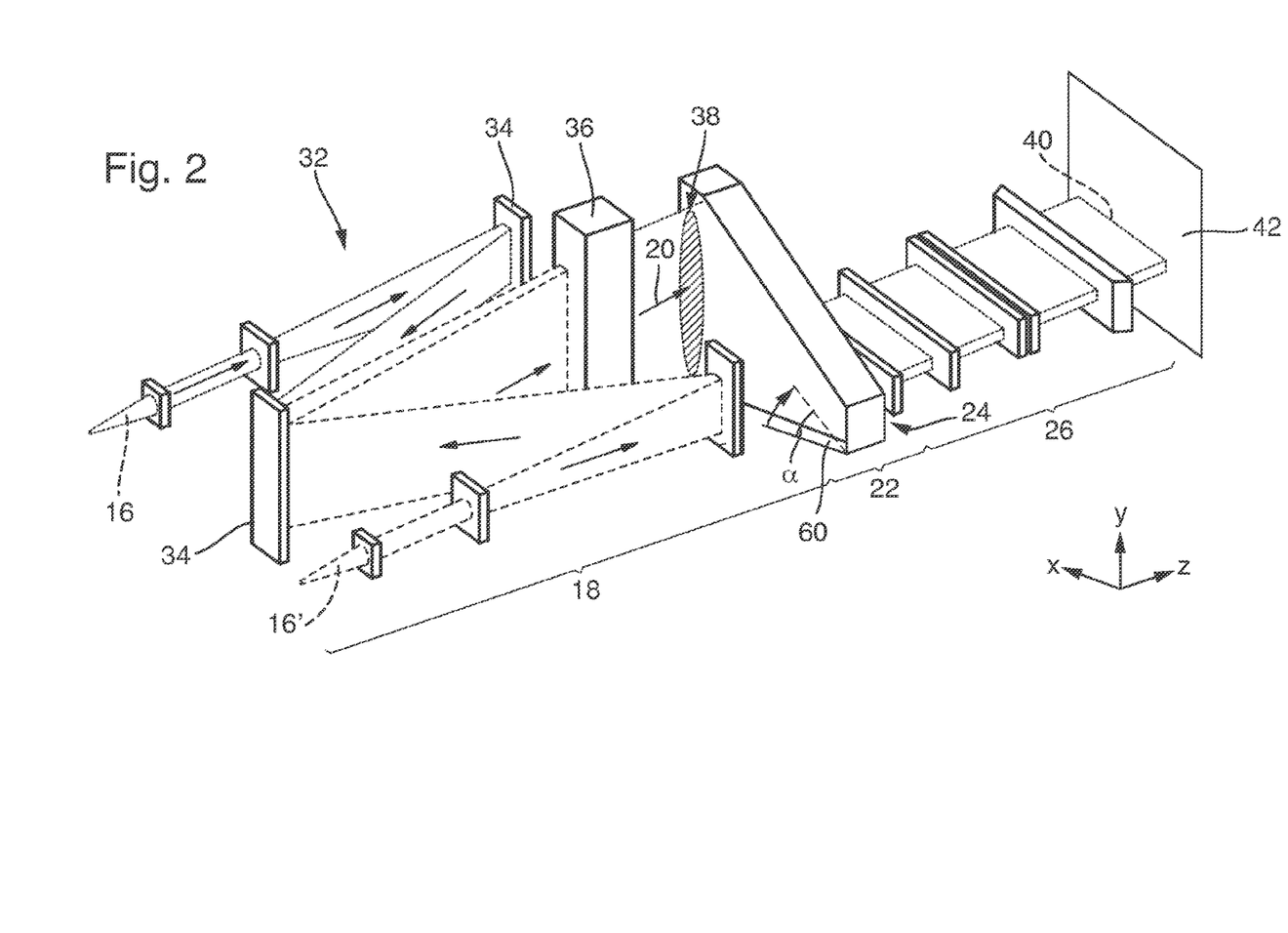
FIG. 2 s a perspective view of an optical arrangement having a preforming optical unit, a reshaping optical unit and a homogenization optical unit.

FIG. 2 is a perspective view illustrating the optical arrangement 32. It is conceivable for the laser radiation 16 to first be reshaped into the input laser beam 20 by means of deflecting mirrors 34 and/or lens means 36. In the example shown, the optical elements of the preforming optical unit 18 are designed such that the input laser beam has an elliptical beam cross section 38. Furthermore, the input laser beam 20 can be fed by laser radiation 16' from at least one further laser light source. The laser radiation 16, 16' from the different laser light sources can be brought together e.g. via a common deflecting mirror 34 (dotted and dashed beam path in FIG. 2).

To illustrate the geometric relationships, a Cartesian coordinate system (x, y, z) is shown in FIG. 2. In the example shown, the input laser beam 20 propagates along the z direction. The elliptical beam cross section 38 has a long axis along the y-axis and correspondingly has a small diameter along the x-axis.

As will be explained in more detail below, the reshaping optical unit 22 reshapes the input laser beam 20 into a beam packet 24, which is converted by means of the homogenization optical unit 26 into an output beam 40, which extends in a line-like manner in a working plane 42 of the optical arrangement 32 along a direction of the line (x).

Figure 3:
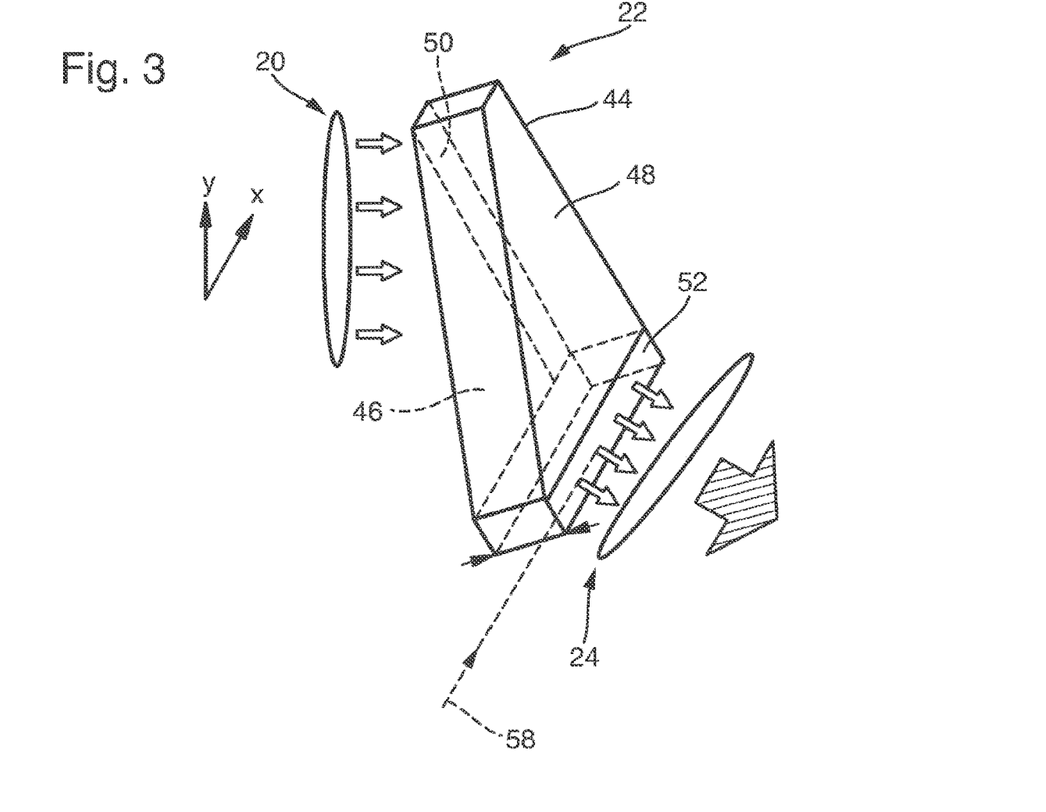
FIG. 3 s a schematic view of a reshaping optical unit.

FIG. 3 is a schematic view of the reshaping optical unit 22 in one possible embodiment. In the example shown, the reshaping optical unit is designed as a one-piece, plate-like reshaping body 44 made of a material that is transparent for the laser radiation.

The reshaping body 44 has a plate front side 46 and a plate rear side 48 running parallel thereto. A region of the plate front side 46 serves as a light incoupling surface and provides an input aperture 50 of the reshaping optical unit 22 through which the input laser beam 20 can be coupled into the reshaping body 44. A region of the plate rear side 48 acts as a light outcoupling surface and provides an output aperture 52 through which the beam packet 24 exits.

Figure 4:
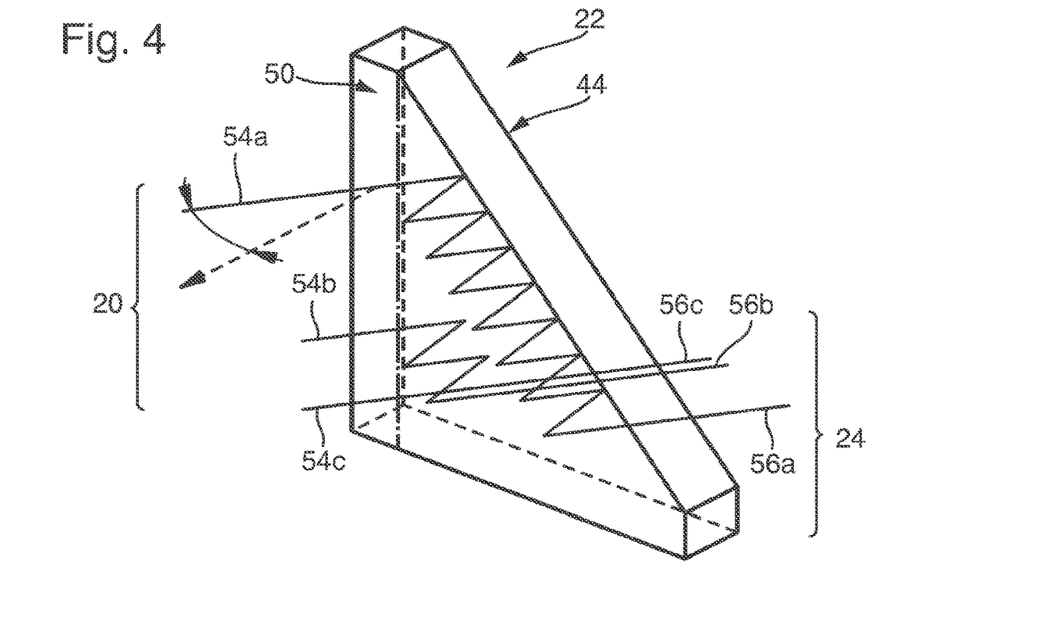
FIG. 4 is a schematic view illustrating the beam path in a reshaping optical unit.

As shown schematically in FIG. 4, the reshaping optical unit 22 acts in particular in such a way that adjacent beam segments 54a, 54b, 54c of the input laser beam 20 are rearranged into beam segments 56a, 56b, 56c of the beam packet 24 upon passing through the reshaping optical unit 22. In the example shown, this takes place by the beam segments 54a, 54b, 54c coupled in through the input aperture 50 being guided by internal reflection into the reshaping body 44 between the plate front side 46 and the plate rear side 48 to the output aperture 52. Because the beam segments 54a to 54c are coupled in through the input aperture at different locations, the beam segments 56a to 56c exiting from the output aperture 52 have covered different optical path lengths. The reshaping body 44 is designed in particular in such a way that the optical paths of the different beam segments 56a to 56c are different from one another in such a way that the beam packet 24 has greatly reduced spatial coherence, and in particular is incoherent. This is, in particular, because the differences in the optical path lengths for the beam segments 56a to 56c are large compared with the coherence length of the laser radiation 16.

As indicated in FIG. 2, the reshaping optical unit 22 is arranged in such a way that the output aperture 52 is rotated about the z-axis with respect to the direction of the line x. In the example shown, this is characterized by an angle of rotation a, which defines the enclosed acute angle between an aperture longitudinal direction 58 of the output aperture 52 and the direction of the line x. The aperture longitudinal direction 58 is the direction along which the elongate (rectangular in the example shown) output aperture 52 extends (cf. FIG. 3).

The reshaping optical unit 22 is preferably held in the optical arrangement 32 by means of an adjustable holding device 60 (shown schematically in FIG. 2). The holding device 60 is designed such that the angle of rotation a is continuously adjustable.

Figure 5:
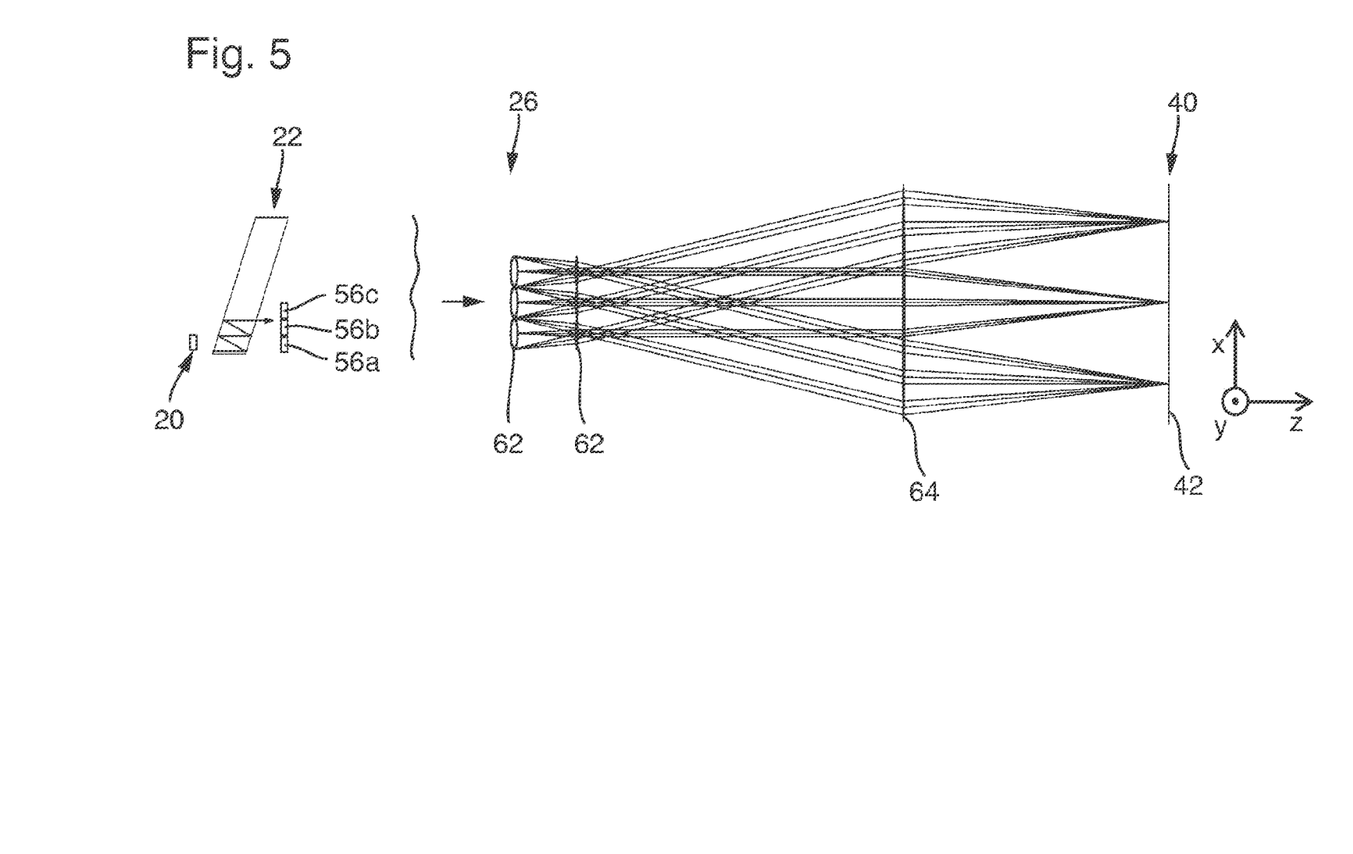
FIG. 5 is a schematic view illustrating the effect of the homogenization optical unit along the long axis (direction of the line)

FIG. 5 schematically shows the operating principle of the homogenization optical unit 26. In principle, the homogenization optical unit is arranged in such a way that it captures the beam packet 24 and converts said beam packet into the output beam 40, which extends along the direction of the line (x) in a line-like manner. Different beam segments 56a, 56b, 56c of the beam packet 24 are intermixed and superimposed, such that the desired line-like intensity distribution is set in the working plane 42. In particular in conjunction with the reshaping optical unit 22, which preferably largely eliminates the coherence of the input laser beam, the intermixing and superimposition of the beam segments of the beam packet 24 results in the output beam 28 being largely homogeneous along the direction of the line x and having a substantially constant intensity curve.

For example, the homogenization optical unit 26 can have at least one cylinder lens array 62 which acts on the beam segments 56a, 56b, 56c, . . . such that they overlap in the working plane 42. The homogenization optical unit can also comprise a Fourier lens 64, which is designed for focusing with respect to the x-axis. The Fourier lens 64 is arranged in particular such that the working plane 42 extends in a focal plane of the Fourier lens 64.

Figure 6A:
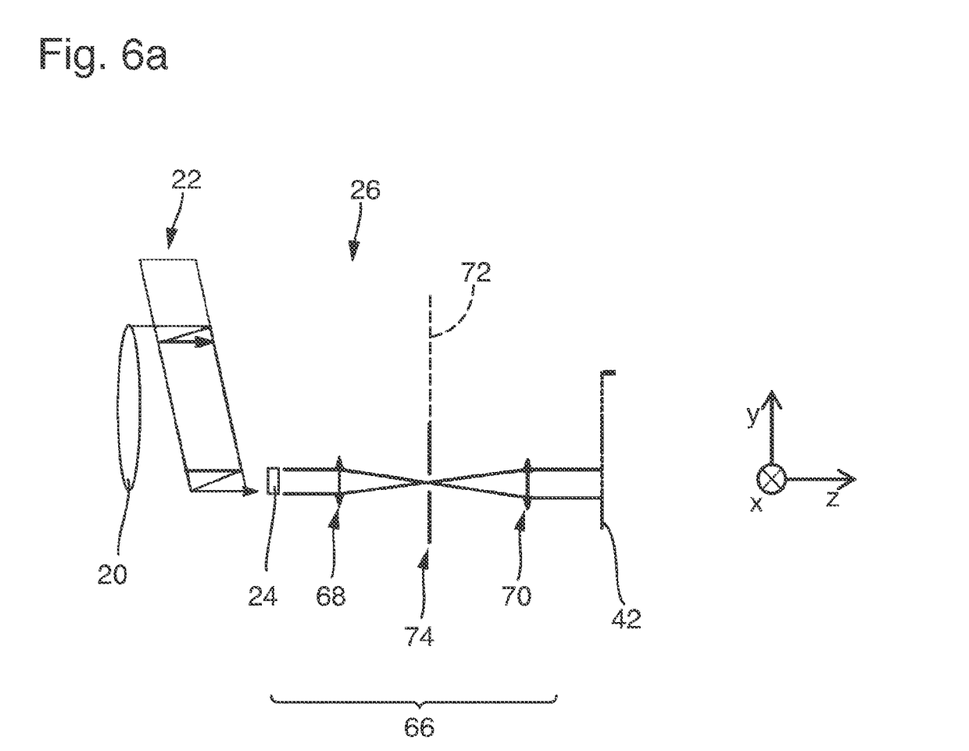
FIGS. 6(a)-6(d) are schematic views illustrating the effect of the homogenization optical unit along the short axis (y)

The homogenization optical unit 26 preferably also comprises a transverse optical unit 66 (cf. FIG. 6a), which is designed for focusing and/or imaging the beam packet 24 with respect to the short axis y. For example, the transverse optical unit 66 comprises a first converging lens 68 and a second converging lens 70 arranged so as to be successive in the beam path. In a focal plane 72 of the first converging lens 68, the intensity distribution substantially corresponds to the Fourier transform of the beam packet 24. For a further embodiment, an optical low-pass filter 74 can be provided, for example in the form of a slit stop in the focal plane 72. The optical low-pass filter 74 filters high spatial frequencies with respect to the short axis y. The second converging lens 70 is preferably arranged such that the focal plane 72 coincides with the object-side focal plane of the second converging lens 70.

Figures 6B, 6C, 6D:
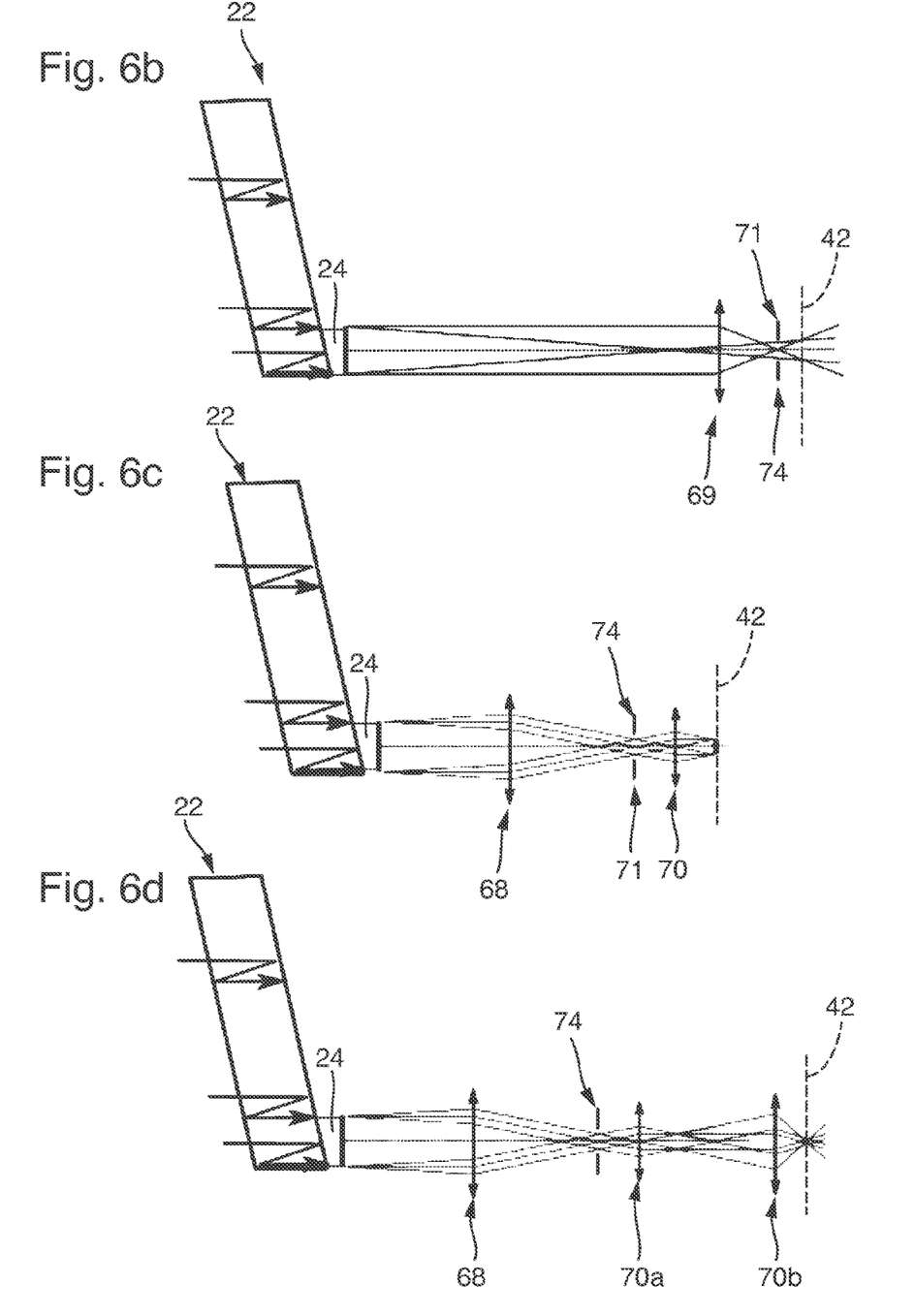

In principle, different embodiments are conceivable for the transverse optical unit 66. In particular, it is not absolutely necessary to provide a symmetrical structure as in FIG. 6a. Arrangements with more than two converging lenses or with only one converging lens are also conceivable. Corresponding examples are shown schematically in FIGS. 6b to 6d. FIG. 6b shows a transverse optical unit having a single effective converging lens 69, which generates an intermediate focus 71 for the beam packet 24. The spatial frequencies can be filtered in the intermediate focus 71, for example by means of a low-pass filter 74. FIG. 6c shows an embodiment having the basic structure. as in FIG. 6a, with the converging lenses 68 and 70 having different focal lengths. This results in an image scale not equal to 1:1. A structure with three converging lenses is shown schematically in FIG. 6d. The first converging lens 68 again generates an intermediate focus 71 in which the filtering can take place using the low-pass filter 74. The filtering result is imaged in the working plane 42 with an arrangement of two lenses 70a and 70b.

Figure 7:
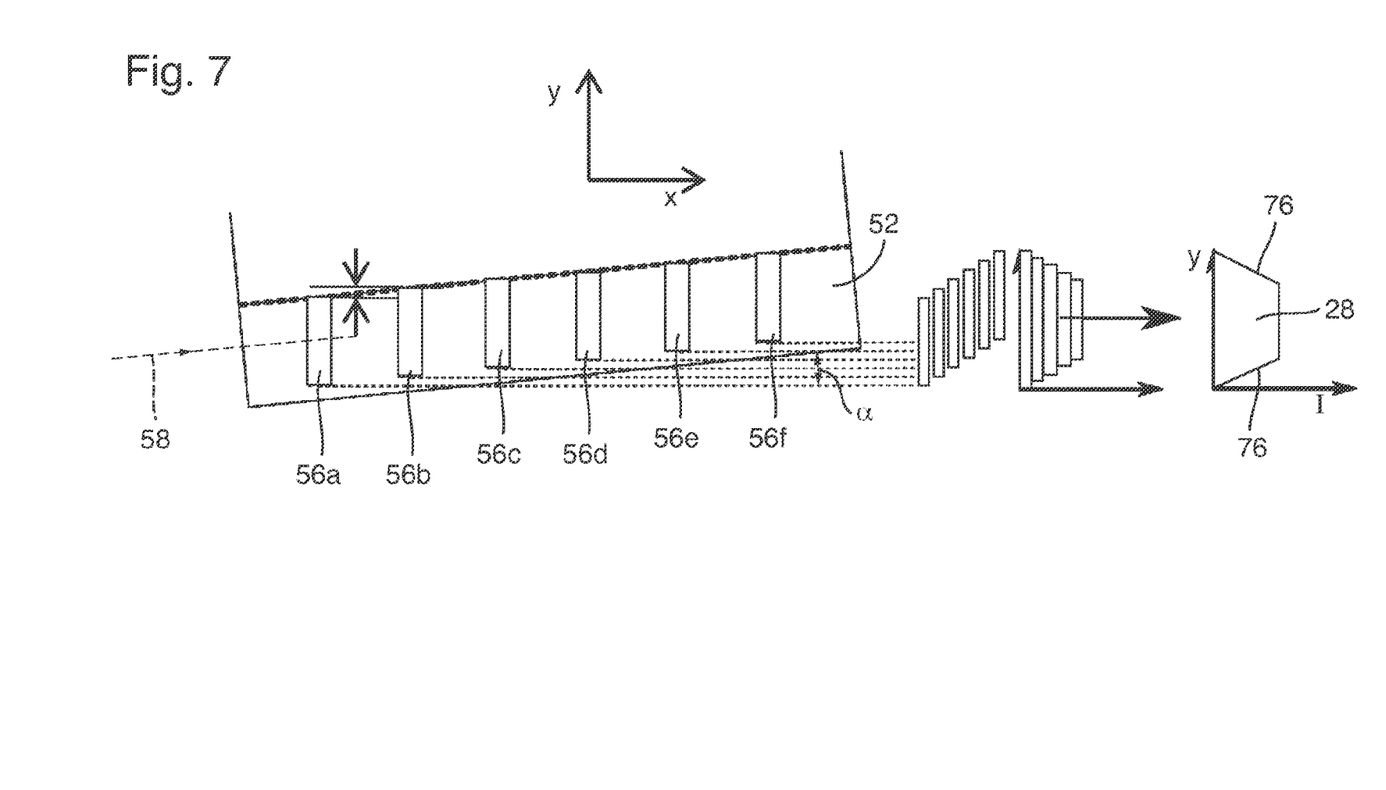
FIG. 7 is a schematic view illustrating the dependency of the intensity profile on the angle of rotation.

The influence of the angle of rotation a between the aperture longitudinal direction 58 and the direction of the line x on the intensity curve of the output beam 28 along the short axis y is illustrated by FIG. 7. FIG. 7 is a schematic view of the output aperture 52, which extends along the aperture longitudinal direction 58 in an elongate manner. In the example shown, beam segments 56a to 56f of the beam packet 24 exit through the output aperture 52.

Upon passing through the homogenization optical unit 26 (cf. FIG. 5), the beam segments 56a to 56f are intermixed and superimposed with respect to the long axis x (direction of the line). Since, due to the angle of rotation a, adjacent beam segments 56a to 56f are offset from one another along the short axis y in each case, the intermixing and superimposition results in the output beam 28 having a trapezoidal curve along the short axis y. The gradient of the sides 76 of the intensity curve of the output beam 28 along the short axis y can be influenced by adjusting the angle of rotation a.

Figure 8:
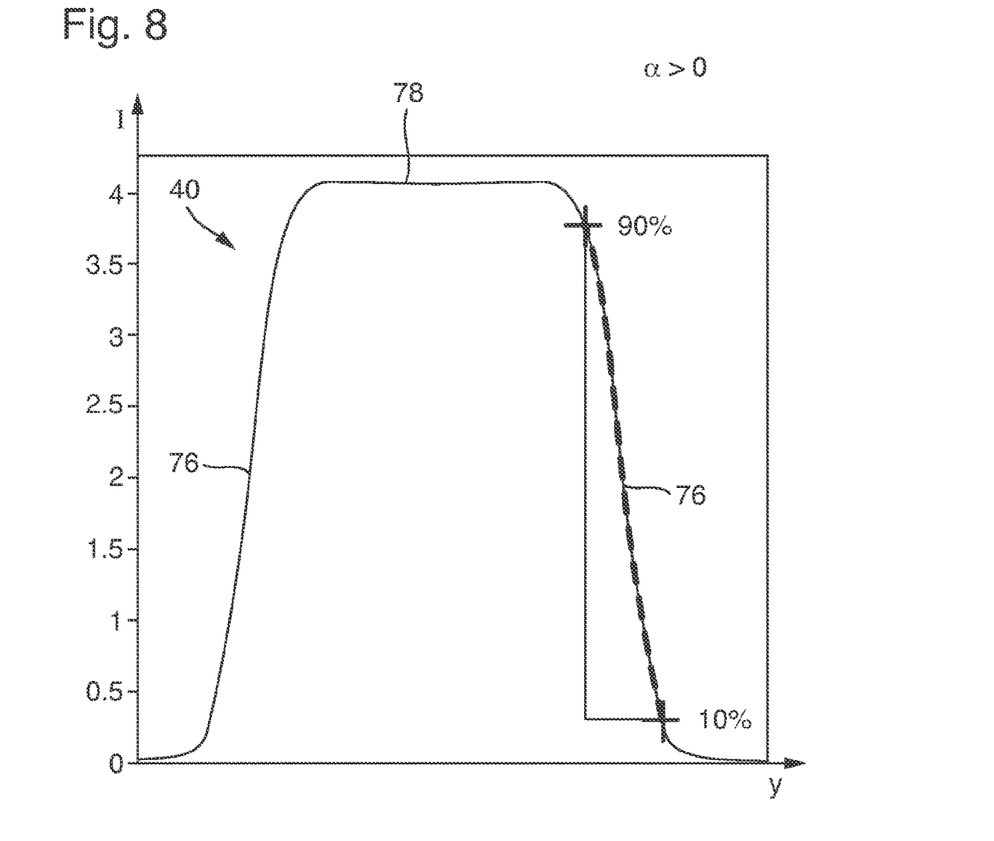
FIG. 8 s a schematic view of an intensity curve along the short axis (y) illustrating the side gradient.

FIG. 8 shows a curve of the intensity of the output beam 40 in the working plane 42 as a function of a position coordinate along the short axis y by way of example. The intensity I and the position coordinate y are given in dimensionless units. The output beam 40 for a non-vanishing angle of rotation a between the aperture longitudinal direction 58 and the direction of the line x is shown. Due to the homogenization by the homogenization optical unit 26, the intensity distribution 40 has a largely constant curve in a central region 78, and the sides 76 fall in peripheral regions. The sides 76 result from the fact that the beam segments 56a, 56b, 56c, . . . of the beam packet 24 make smaller contributions to the output beam 40 due to the angle of rotation a in the peripheral regions. The gradient of the sides 76 can be determined by means of the width of an interval of the position coordinates along the short axis y, over which interval the intensity I increases from 10% to 90% of the value in the central region 78 (cf. FIG. 8). This allows a gradient triangle to be defined, from which the gradient can be determined as the quotient of the increase in intensity (80%) and the required interval of the position coordinates.

Figure 9:
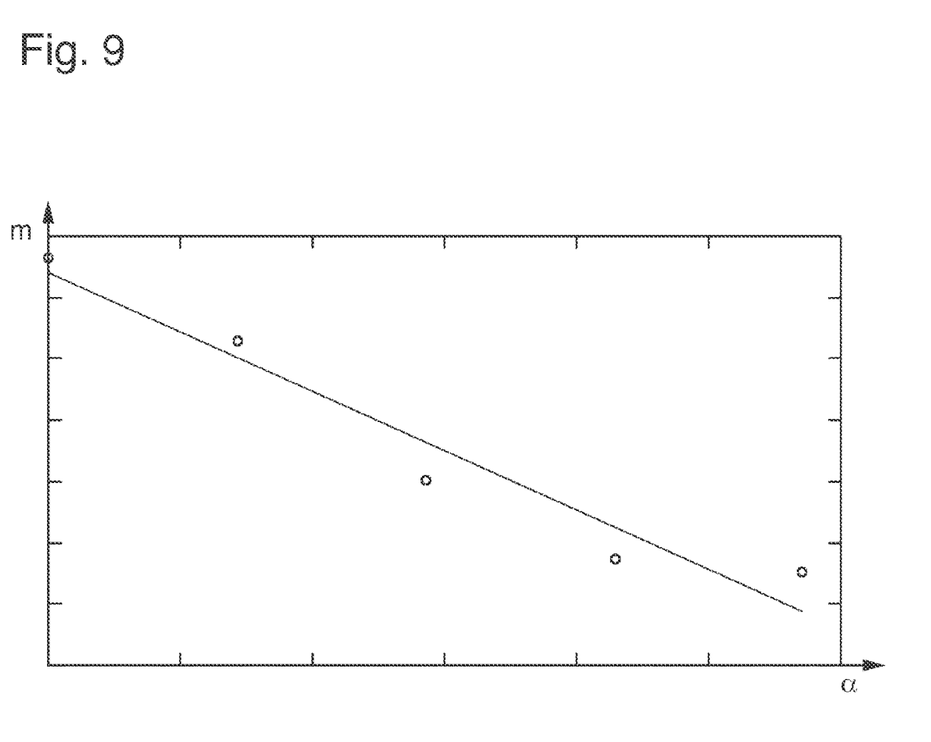
FIG. 9 is a schematic view illustrating a dependence of the side gradient on the angle of rotation.

The dependence of the gradient (m) of the sides on the angle of rotation a is shown schematically in FIG. 9. In the field of small angles (small-angle approximation), the gradient of the sides 76 decreases substantially proportionally to the angle of rotation a.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An optical arrangement for converting an input laser beam into a line-like output beam, which propagates along a direction of propagation and which has, in a working plane, a line-like beam cross section of non-vanishing intensity that extends along a direction of a line, the optical system comprising:
 a reshaping optical unit having an input aperture, through which the input laser beam can be radiated, and an elongate output aperture, which extends along an aperture longitudinal direction in an elongate manner, the reshaping optical unit being configured wherein the input laser beam radiated through the input aperture is converted into a beam packet exiting through the output aperture; and
 a homogenization optical unit which is designed to convert the beam packet into the line-like output beam, different beam segments of the beam packet being intermixed and superimposed along the direction of the line, wherein the aperture longitudinal direction extends in a manner rotated about the direction of propagation by a non-vanishing angle of rotation with respect to the direction of the line.

2. The optical arrangement according to claim 1, wherein the non-vanishing angle of rotation is greater than 0 degrees and less than 90 degrees.

3. The optical arrangement according to claim 1, the optical arrangement further comprising an adjustable holding device for the reshaping optical unit, wherein the adjustable holding device is configured in such a way that the angle of rotation is adjustable.

4. The optical arrangement according to claim 3, wherein the adjustable holding device is configured such that the reshaping optical unit is rotateable about the aperture longitudinal direction.

5. The optical arrangement according to claim 3, wherein the adjustable holding device is configured such that the reshaping optical unit rotateable about an axis perpendicular to the aperture longitudinal direction and to the direction of propagation.

6. The optical arrangement according to claim 1, wherein the reshaping optical unit is configured such that, when the input laser beam having a high spatial coherence is radiated through the input aperture, the beam packet exiting the output aperture has a significantly reduced spatial coherence.

7. The optical arrangement according to claim 6, wherein beam packet exiting the output aperture is incoherent.

8. The optical arrangement according to claim 1, wherein the reshaping optical unit is configured such that adjacent beam segments of the input laser beam, upon passing through the reshaping optical unit, are rearranged into beam segments of the beam packet, wherein adjacent beam segments of the beam packet, upon passing through the reshaping optical unit, have covered different optical path lengths, such that the beam packet has a reduced spatial coherence.

9. The optical arrangement according to claim 8, wherein the reshaping optical unit is formed from a monolithic, plate-like, transparent material, having a plate front side and a plate rear side extending substantially parallel thereto, wherein a region of the plate front side provides the input aperture and a region of the plate rear side provides the output aperture, wherein the reshaping optical unit is configured such that the beam segments of the input laser beam after incoupling through the input aperture are guided to the output aperture by reflection on the plate front side and the plate rear side.

10. The optical arrangement according to claim 8, wherein the beam packet is incoherent.

11. The optical arrangement according to claim 1, wherein the output aperture is rectangular and a long rectangle side extends parallel to the aperture longitudinal direction.

12. The optical arrangement according to claim 1, wherein the output aperture extends trapezoidally or polygonally or band-like or freeform, and has a long preferred direction which extends parallel to the aperture longitudinal direction.

13. The optical arrangement according to claim 1, wherein the homogenization optical unit is configured such that different beam segments of the beam packet are not intermixed or are not superimposed on one another with respect to an axis perpendicular to the direction of the line and perpendicular to the direction of propagation.

14. The optical arrangement according to claim 1, wherein the homogenization optical unit comprises a transverse optical unit for focusing and/or optically imaging the beam packet with respect to an axis perpendicular to the direction of the line and perpendicular to the direction of propagation in the working plane or in a focal plane that is offset from the working plane.

15. The optical arrangement according to claim 1, wherein the homogenization optical unit comprises an optical low-pass filter for filtering high spatial frequencies with respect to an axis perpendicular to the direction of the line and perpendicular to the direction of propagation.

16. A laser system for generating radiation having an intensity distribution, which has a line-shaped intensity profile in the beam cross section, the laser system comprising:
 a laser light source for emitting laser radiation;
 the optical arrangement according to claim 1, wherein the optical arrangement is arranged such that the input laser beam for the input aperture is fed by the laser light source.

* * * * *